(12) United States Patent
Ikeda

(10) Patent No.: US 8,614,791 B2
(45) Date of Patent: Dec. 24, 2013

(54) SPECTROSCOPE

(75) Inventor: Yuji Ikeda, Kobe (JP)

(73) Assignee: Imagineering, Inc., Kobe-shi, Hyogo (JP)

( * ) Notice: Subject to any disclaimer, the term of this patent is extended or adjusted under 35 U.S.C. 154(b) by 0 days.

(21) Appl. No.: 13/283,151

(22) Filed: Oct. 27, 2011

(65) Prior Publication Data

US 2012/0038919 A1 Feb. 16, 2012

Related U.S. Application Data

(63) Continuation of application No. PCT/JP2010/057635, filed on Apr. 28, 2010.

(30) Foreign Application Priority Data

Apr. 28, 2009 (JP) ................................. 2009-109360

(51) Int. Cl.
*G01J 3/28* (2006.01)

(52) U.S. Cl.
USPC ........................................................ 356/328

(58) Field of Classification Search
USPC .......................................... 356/326, 328, 334
See application file for complete search history.

(56) References Cited

U.S. PATENT DOCUMENTS

| | | | |
|---|---|---|---|
| 3,252,674 A * | 5/1966 | Magnus | 250/214.1 |
| 4,019,811 A * | 4/1977 | Lorah et al. | 359/212.1 |
| 5,446,534 A * | 8/1995 | Goldman | 356/128 |

FOREIGN PATENT DOCUMENTS

| | | | |
|---|---|---|---|
| JP | 53-120543 A | | 10/1978 |
| JP | 57-169635 A | | 10/1982 |
| JP | 3-023326 U | | 3/1991 |
| JP | 11-142240 A | | 5/1999 |
| JP | 2001-242011 A | | 9/2001 |
| SU | 1226077 A1 | | 4/1986 |
| SU | 1781859 A1 | | 12/1992 |

OTHER PUBLICATIONS

International Search Report of PCT/JP2010/057635, mailing date Aug. 24, 2010.
Proceeding of the Thirty-Fifth Japanese Symposium of Combustion, p. 54-56 (1997).

* cited by examiner

*Primary Examiner* — Tarifur Chowdhury
*Assistant Examiner* — Abdullahi Nur
(74) *Attorney, Agent, or Firm* — Westerman, Hattori, Daniels & Adrian, LLP

(57) ABSTRACT

Provided is a spectroscope that can be manufactured easily, can be reduced in size, and can provide high wavelength resolution of a specific spectral band. Specifically, provided is a spectroscope with a diffraction grating 331 that deflects and separates incident light in different directions depending on to an element of the incident light, at least one optical element 332a, diffusing a light that has passed through this diffraction grating 331 and has entered the optical element 332a, a line sensor 333, which receives the light that has passed through the optical element 332a, thereby only light that has a specific deflection angle within a specific range of wavelengths from among all the light that entered said optical element 332a is selectively expanded and received.

20 Claims, 9 Drawing Sheets

SPECTROSCOPE

TECHNICAL FIELD

This invention relates to a spectroscope, which measures the spectrum of light within a prescribed band, using an optical measurement device.

BACKGROUND OF THE INVENTION

Characteristics of light, such as Raman scattering, spontaneous glow, plasma incandescence, fluorescence, phosphorescence, and synchrotron radiation, etc., which occur due to the laws of physics, chemistry, or plasma reactions (hereafter, these reactions are referred to as, "reaction"), greatly depend on the minute mechanism of light emission and on changes in these reactions. Therefore, the characteristics of the reaction and its correlation with the reactive amounts can be determined by measuring the light resulting from such a minute mechanism. Moreover, it is possible to control the reaction based on information obtained from the measurement of a minute reaction mechanism, and information on the rate of change of the reaction can be determined from measurements made with high time resolution. Moreover, it is possible to obtain useful data to improve the device that generates the reaction. Such a measurement is necessary to control and improve various types of combustion equipment by analyzing combustion in an automobile engine, gas turbine, etc.

To determine the minute mechanism of the above-mentioned reaction from spectral measurements, it is necessary to obtain a "local" measurement, that is, a measurement in a small volume, relative to the space in which the reaction occurs. It is also necessary to acquire time-series measurements, that is, measurements that are repeatedly and continuously made in short time intervals, relative to the time interval over which the reaction mechanism changes.

In non-patent document 1, an optical measurement device that measures the spontaneous glow, or natural luminescence, of the reaction has been described; this device is capable of achieving the measurements described above. This optical measurement device has achieved local, real-time measurements of the reaction by means of focusing optics and a catoptric system designed for local point measurements, by reducing the volume in which the measurement is made to 1.6 mm×φ0.2 mm, and by sampling at a high rate of 250 kHz using a photoelectric tube as the light-receiving means combined with high-speed processing. Moreover, in this document, the device is described as an instrument used to measure the spontaneous glow of the reaction by simultaneously measuring each wavelength corresponding to the luminescence from the three chemical species OH*, CH*, and C2*.

Additionally, as already described in patent document 1, the inventors are proposing an optical measurement device, which can efficiently make local, high-resolution, time-series measurements of light from two or more measurement points. This optical measurement device measures the luminescence of the combustion reaction within the local part of the combustion chamber, using a catoptric system, and detects the local reactive characteristics.

In this optical measurement device, the light emitted from the reaction in the local part or the combustion chamber, that is an object point of this catoptric system, is measured by arranging the incident edge surface of an optical fiber at the focus position of the catoptric system and by measuring the spectrum of the light that is transported by this optical fiber. Because the surface that contributes to the image formation is a reflective surface in the catoptric system, chromatism does not occur, and, therefore, an accurate measurement of the light, from the reaction can be made.

[Patent Literature 1] Japanese Patent Laid-Open No. 2000-111398

[Non Patent Literature 1] Proceedings of the Thirty-Fifth Japanese Symposium on Combustion, p. 54-56 (1997)

The spectroscope used in the above-mentioned optical measurement device evenly measures the light from the measurement point across all wavelengths of the optical spectrum. In other words, the device measures the light at wavelengths beyond those necessary to obtain information on a minute mechanism of the reaction. Therefore, for efficient analysis of only relevant portions of the spectrum, it is necessary to disregard the light at non-relevant wavelengths. As a result, the resolution of specific wavelengths of light in relevant emission bands might be insufficient in an optical measurement device with such a catoptric system. Moreover, the spectroscope may become large and unwieldy if adequate wavelength resolution is secured for all wavelengths. Thus, it is comparatively difficult to manufacture or use such a spectroscope that has adequate performance.

The present invention is proposed to solve these problems. Provided is a spectroscope that can be manufactured easily and can provide high wavelength resolution within a specific spectral band.

SUMMARY OF THE INVENTION

The spectroscope of the present invention has any of the following configurations for solving the problems described above.

[Configuration 1]

A spectroscope comprising: a spectrum element deflecting and separating incident light in different directions, depending on an element of the incident light: at least one optical element diffusing a light that has passed through said spectrum element and has entered the optical element; and a light-receiving means receiving light that has passed through said optical element; wherein only light that has a specific deflection angle within a specific range of wavelengths from among all the light that entered said optical element is selectively expanded and received.

[Configuration 2]

The spectroscope according to configuration 1, wherein each element of said light that is diffused by said optical element does not overlap on a light-receiving surface of said light-receiving means.

[Configuration 3]

The spectroscope, according to configuration 1 or 2, wherein said spectrum element deflects and separates said incident light in different directions according to wavelength.

[Configuration 4]

The spectroscope according to configuration 3, wherein said spectrum element is a diffraction grating.

[Configuration 5]

The spectroscope according to configuration 4, wherein said diffraction grating is formed on a refraction surface of a collimator that converts said incidence light into parallel rays.

[Configuration 6]

The spectroscope according to configuration 3, wherein said spectrum element is a prism.

[Configuration 7]

The spectroscope according to one of configuration 2 through 6, wherein a spectral hand of said light that enters said optical element is at least one band that has been chosen beforehand, according to a sample component analysis based on a spectroscopic measurement.

[Configuration 8]

The spectroscope according to one of configuration 2 through 6, wherein the spectral band of said light that enters said optical element contains at least one among: a first band with wavelength 306.4 nm, half-width from 10 to 15 nm; a second band with wavelength 388 nm, half-width from 10 to 15 nm; a third band with wavelength 431.5 nm, half-width from 1 to 2 nm; a forth band with wavelength 473.3 nm, half-width from 1 to 2 nm; a fifth band with wavelength 516.5 nm, half-width from 1 to 2 nm; a sixth band with wavelength 650 nm, half-width from 10 to 15 nm; and a seventh band with wavelength 810 nm, half-width from 10 to 15 nm.

[Configuration 9]

The spectroscope according to configuration 1 or 2, wherein said spectrum element deflects and separates said incident light in different directions according to a polarization angle of the light.

[Configuration 10]

The spectroscope according to configuration 1 or 2, wherein said spectrum element is an inclination prism.

[Configuration 11]

The spectroscope according to one of configuration 1 through 10, wherein said light-receiving means is a line sensor.

[Configuration 12]

The spectroscope according to one of configuration 1 through 10, wherein said light-receiving means is an image sensor that has light-receiving elements arranged in a matrix.

[Configuration 13]

The spectroscope according to configuration 12, wherein said incident light respectively enters said light-receiving elements from two or more positions in parallel to a light-deflected surface by said spectrum element and along optical axes with prescribed angles to an arrangement plane of said light-receiving elements of said image sensor.

[Configuration 14]

The spectroscope according to one of configuration 1 through 10, wherein said light-receiving means is an exposure device that receives the light that has passed through said optical element and exposes a prescribed photosensitive material to this light.

[Configuration 15]

The spectroscope according to one of configuration 1 through 14, wherein said incident light enters from two or more positions and each ray of light that is spectrum by said spectrum element and is selectively expanded by said optical element from among said incident light is received on one prescribed straight line.

[Configuration 16]

The spectroscope according to one of configuration 1 through 15, wherein said optical element is a concave lens or a convex mirror.

[Configuration 17]

The spectroscope according to one of configuration 1 through 15, wherein said optical element is a prism or a diffraction grating whose light-polarized surface matches the light-polarized surface of said spectrum element.

[Configuration 18]

The spectroscope according to one of configuration 1 through 15, wherein said optical element is a Nicol prism, Prizmurostion, or Worrastomprizm.

[Configuration 19]

The spectroscope according to one of configuration 1 through 18, further comprising a means to irradiate said light-receiving elements with a reference light.

In the spectroscope that comprises configuration 1, the light that passes through the spectrum element enters at least one optical element, which diffuses the light. Because only the light of a specific spectral band enters the optical element to be expanded and is therefore, selectively received by the light-receiving element, high resolution can be achieved for the specific spectral band, while the distance from the spectrum element to the light-receiving element is relatively short. Therefore, high wavelength resolution can be achieved for light from a specific spectral band, while manufacturing is easy, and miniaturization is possible.

In the spectroscope that comprises configuration 2, each spectral band can be analyzed accurately because each band of light that is diffused by an optical element is received on the light-receiving surface of a light-receiving means without overlap.

In the spectroscope that comprises configuration 3, high wavelength resolution can be achieved for a specific spectral band, while manufacturing is easy, and miniaturization is possible.

In the spectroscope that comprises configuration 4, because the spectrum element is a diffraction grating, the light incident on this diffraction grating is deflected and separated in different directions within one plane, depending on the wavelength.

In the spectroscope that comprises configuration 5, because the diffraction grating is formed on the refraction surface of a collimator, the deflection angle can be increased due to refraction by the collimator. This increased deflection angle facilitates miniaturization of the spectroscope and enables high wavelength resolution.

In the spectroscope that comprises configuration 6, because the spectrum element is a prism, the light incident on this prism is deflected and separated by refraction in different directions, depending on the wavelength.

In the spectroscope that comprises configuration 7, the spectral band that enters an optical element is chosen beforehand, according to a sample component, analysis based on a spectroscopic measurement. Therefore, the desired spectral band can be selected, and the light in the spectral band can he measured with high wavelength-resolution.

In the spectroscope that comprises configuration 8, the wavelengths of light that enter the optical element are comprised of at least one among a first band with wavelength 306.4 nm, half-width from 10 to 15 nm, a second hand with wavelength 388 nm, half-width from 10 to 15 nm, a third band with wavelength 431.5 nm, half-width from 1 to 2 nm, a fourth band with wavelength 473.3 nm, half-width from 1 to 2 nm, a fifth hand with wavelength 516.5 nm, half-width from 1 to 2 nm, a sixth band with wavelength 650 nm, half-width from 10 to 15 nm, and a seventh band with wavelength 810 nm, half-width from 10 to 15 nm.

In the spectroscope that comprises configuration 9, the spectrum element deflects and separates the incident light in different directions, depending on the polarization angle of the light. Therefore, high wavelength resolution can be achieved for specific polarized light, while manufacturing is easy, and miniaturization is possible.

In the spectroscope that comprises configuration 10, the spectrum element is an inclination prism. Therefore, the light incident to this inclination prism is deflected and separated in different directions, depending on the polarization angle.

In the spectroscope that comprises configuration 11, the light-receiving element is a line sensor. Therefore, it is possible to efficiently receive the light separated by the spectrum element.

In the spectroscope that comprises configuration 12, the light-receiving elements are arranged in a matrix. This is similar to a configuration in which two or more line sensors are arranged. Therefore, the light separated by the spectrum element is efficiently received.

In the spectroscope that comprises configuration 13, the incident light enters the light-receiving element, from two or more positions in a direction parallel to the light polarized by the spectrum element and along optical axes with prescribed angles to the arrangement plane of the light-receiving element of the image sensor. Therefore, the image sensor can receive the light in hatches without overlapping of the light that enters from two or more positions. This spatial resolution facilitates the miniaturization of the entire spectroscopic system.

In the spectroscope that comprises configuration 14, the exposure device exposes a photosensitive material to the light that passes through an optical element. Therefore, it is possible to take a photograph of the light separated by the spectrum element. As a result, the range of electromagnetic radiation that can be measured by the spectroscope increases giving the instrument a wider application range.

In the spectroscope that comprises configuration 15, the incident light that enters from two or more positions is received on one straight line after being selectively separated into its spectrum and expanded. Therefore, it is possible to sum elements that have been selectively expanded among two or more incident beams of light.

In the spectroscope that comprises configuration 16, because the optical element is a concave lens or a convex mirror, the light that has entered this optical element through the spectrum element diffuses.

In the spectroscope that comprises configuration 17, because the optical element is a prism or a diffraction grating, the light that enters this optical element is diffused after passing through the spectrum element, depending on its wavelength.

In the spectroscope that comprises configuration 18, because the optical element is a Nicol prism, Prizmurostion or Worrastomprizm, the light that enters this optical element is diffused and separated after passing through the spectrum element, depending on the polarization angle.

In the spectroscope that comprises configuration 19, a holograph can be made by irradiating the light that has passed through the spectrum and optical elements to arrive at the light-receiving element with a reference light. As a result, it is possible to gain information on the phase.

DESCRIPTION OF REFERENCE CHARACTERS

Figure 1:
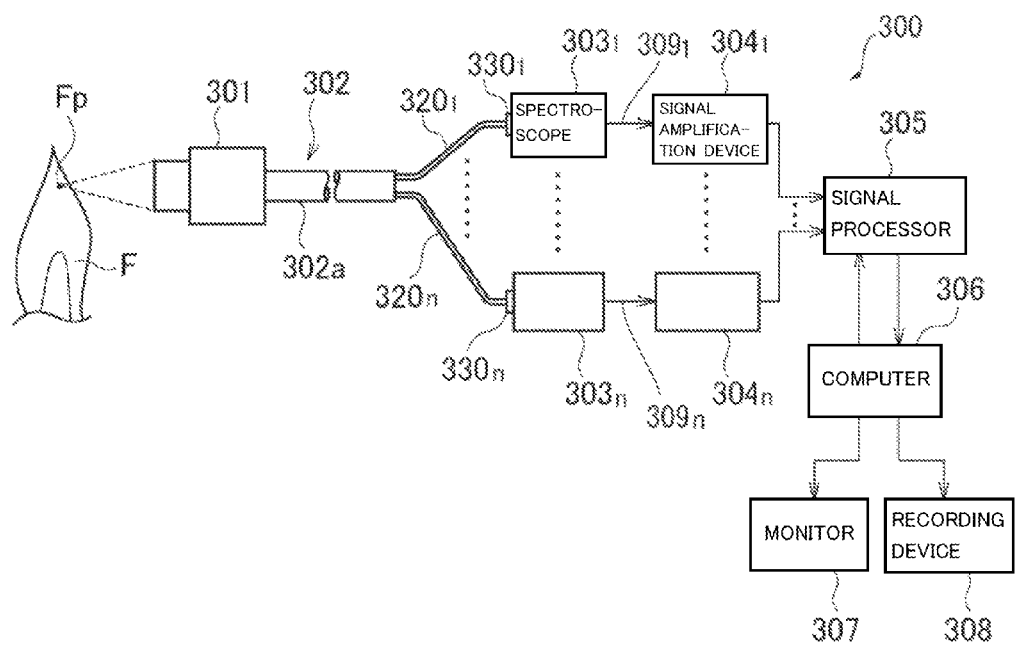
FIG. 1 is a block chart showing the configuration of optical measurement device 300, which uses spectroscope 303 of the $1^{st}$ embodiment of the present invention.

331 Diffraction grating
332a Optical element
333 Line sensor
431 Spectrum element
432a Optical element
433 Image sensor
531 Spectrum element
540 Wedge prism

DETAILED DESCRIPTION OF THE INVENTION

Hereinafter, embodiments of the present invention will he described with reference to the drawings.

$1^{st}$ Embodiment

An optical measurement device 300, to which spectroscope 303 is applied as one embodiment of the present invention, will be described as follows.

FIG. 1 is a block chart showing the configuration of optical measurement device 300 that uses spectroscope 303. In FIG. 1, the number of measurement points is n (n is a plural integer), and focusing of the light from a single measurement point is shown.

This optical measurement device 300 is a device that measures light emitted from the reaction at multiple places within the combustion chamber, either simultaneously or sequentially, by an optical system designed to separate the light rays arriving from different angles to the multipoint; this light may be spontaneous glow, fluorescence, phosphorescence, or synchrotron radiation, etc. For example, the optical measurement device 300 can measure the movement of the generation region of the reaction (i.e., movement of the combustion surface), a change in the moving reaction condition in the combustion chamber of an internal combustion engine, and the chemical reaction characteristics in the combustion chamber.

In this example, the light from measurement point Fp in reaction area F, due to combustion, etc., is focused onto the corresponding focusing point on the focusing plane (not shown in the figure) by focusing optics system 301. The measurement point Fp can be located outside of reaction area F, according to the behavior of reaction area F.

The incident light in this example is the light that originates from black body radiation or from reactive luminescence, which is emitted as a natural light caused by OH*, CH*, CN*, and $C_2$*, etc., in the combustion reaction, and is related to the reactive strength or the heat generation of the reaction and becomes a direct index of the reactive condition.

The focusing optics system 301 in this optical measurement device should be able to focus (i.e., to measure at a local part of the reaction) by providing sufficient positional resolution and focusing efficiency. This focusing optics system 301 can be composed of united optical element 11 shown in FIG. 2.

This optical element 11 is formed as a so-called Cassegrain optics system in one body. Specifically, this optical element 11 is comprised of the first surface 1 and the second surface 2, which is concave as viewed from the first surface 1: a penetration surface exists between the outer part 1a of the first surface 1 and the center part 2b of the second surface 2, and a reflection surface is formed at both the center part 1b of the first surface and the outer part 2a of the second surface. A homogeneous medium 3 with translucency is formed between the first surface 1 and the second surface 2. This optical element 11 is a united optical element; therefore, the refractive index change due to the temperature change, density change, and pressure fluctuation of the medium between the first surface 1 and second surface 2 is small, and there is no risk of turbulent flow change in gas composition, or dust invasion between surfaces 1 and 2. In other words, in optical element 11, deterioration of the optical characteristics due to the influence of heat, free radicals, plasma, electromagnetic radiation, air currents, and dust is negligible. Therefore, excellent optical characteristics can be maintained, even in dusty environments with extreme temperature changes.

In optical element 11, the light at the multipoint of the measurement points $F_1$-$F_n$ is reflected in each surface 1 and 2, then passes through the second area 2b of the second surface 2, and finally is focused to produce images at the focusing points $P_1$-$P_n$, respectively, on the focusing point Fp.

Figure 2:
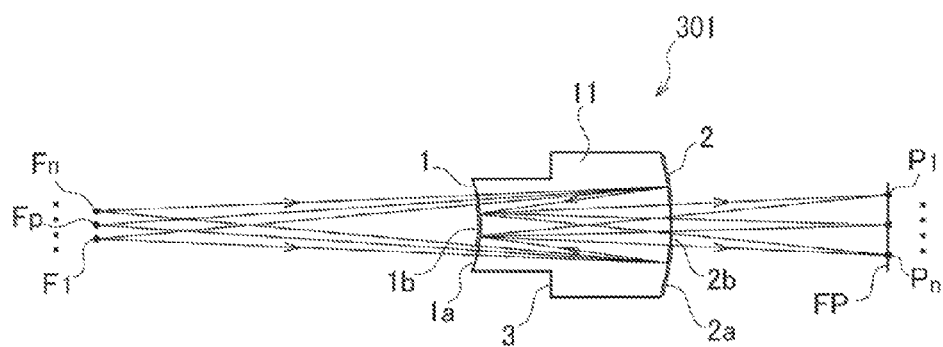
FIG. 2 is a side view showing the configuration of focusing optics system 301 in optical measurement device 300.

An optical fiber array 302 (shown in FIG. 1) is connected with the focusing optics system 301, though it is not shown in FIG. 2. The optical fiber array 302 is composed of n optical fibers $320_1$-$320_n$, which correspond to n measurement points, and their incident edge surfaces are arranged on the focusing plane of focusing optics system 301 in the position of focusing points P1-Pn corresponding to the n measurement points. As a result, the focused light from two or more measurement points is introduced with high efficiency to the optical measurement system through optical fibers $320_1$-$320_n$.

Moreover, the focusing points $P_1$-$P_n$ and optical fibers $320_1$-$320_n$, corresponding to the measurement points $F_1$-$F_n$, can be arranged in a one-, two-, or even three-dimensional matrix array; therefore, the reactive conditions can be measured and observed efficiently.

The optical fiber array 302, as shown in FIG. 1, consists of an optical fiber bundle 302a except for the incident and ejection edge surfaces.

For the setting and selection of the focusing optics system and optical fibers, the appropriate combination can be properly selected based on the positional resolution, measurement volume, and interval spacing between multipoints, etc., that are needed for the measurement. For instance, the working distance of the focusing optics system from the measurement point(s) can he set from a short distance focus (150 mm or less), intended for an engine and a small burner, to a medium (150-600 mm) and long distance focus (600 mm or more).

The optical measurement device 300 also has an optical measurement system. The optical measurement system is comprising: n parts of spectroscopes $303_1$-$303_n$, signal roads $309_1$-$309_n$, and signal amplification devices $304_1$-$304_n$ ; a signal processor 305 that bulk-processes the signals; a computer 306 that controls and retrieves data from signal processor 305; and a monitor 307 and a recording device 308 that displays and records data, respectively, from computer 306.

The ejection edge surfaces of optical fibers $320_1$-$320_n$ are connected to joints $330_1$-$330_n$ of spectroscope $303_1$-$303_n$, respectively, and the light from each of the n measurement points enter spectroscopes $303_1$-$303_n$, where the light diverges into spectra, and measurements are made. This composition makes it possible to measure the light emitted from n measurement points simultaneously (measured at the multipoint) using spectroscopes $303_1$-$303_n$ arranged independently and oriented with respect to the measurement points. As a result, it is possible, for instance, to observe changes in reaction conditions in real time and in two dimensions.

One or more signals that are output from spectroscopes $303_1$-$303_n$ are input to the corresponding signal amplification devices $304_1$-$304_n$ and are input to signal processor 305, which consists of the signal processing circuit, etc. Signal processor 305 is connected to computer 306. Computer 306 controls the signal processing of and receives data from signal processor 305, then analyzes, displays, and records those data using embedded analytical software, transporting the results to monitor 307 and recording the data and results on recording device 308.

Figure 3:
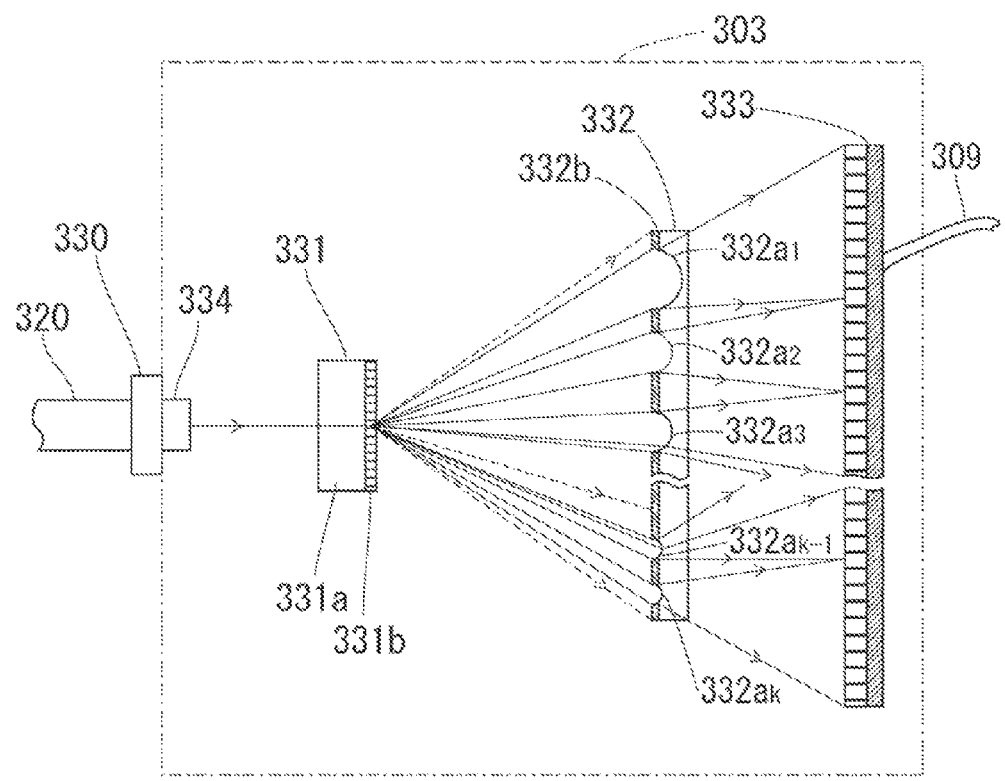
FIG. 3 is a side view showing the configuration of spectroscope 303.

The configuration of spectroscope 303 is shown in the side view of FIG. 3. This spectroscope 303 is designed to select and measure the light emitted from specific chemical species in the material to be observed from among the total light that is introduced through optical fiber 320. Moreover, it is designed to be a high-speed measurement system that can make efficient time-course measurements of a reaction.

The spectroscope 303, shown in FIG. 3, is preferably composed to measure the light emitted from the chemical species OH*, CH*, CN*, and $C_2$*, which are the most important intermediate products in a hydrocarbon combustion reaction. Moreover, for $C_2$*, two species (hereinafter written as $C_2$*(1) and $C_2$*(2)) are measured. OTT* luminescence is observed according to the combustion reaction and high-temperature gas. CH*/$C_2$* luminescence corresponds closely to the combustion reaction area (reactive belt), and $C_2$* luminescence is strongly related to the reaction that generates soot.

Therefore, important information on the combustion reaction can he obtained by measuring the light emitted by each of these free radical species. Moreover, information on the temperature, etc., can be obtained by measuring multiple emission bands (i.e., at two or more wavelengths) of the same radical (e.g., $C_2$*) simultaneously.

The spectroscope 303 measures a spectrum composed of k spectral bands with particularly high resolution from the light that has been ejected from the ejection edge surface 334 of the optical fibers and has been configured into parallel rays by the collimator (not shown in the figure), which is formed on ejection edge surface 334. When spectroscope 303 is configured to measure the light emitted from combustion, the number k of wavelength bands is five or more. In this case, the five wavelength bands correspond to the light emitted by OH*, CH*, CN*, $C_2$*(1), and $C_2$*(2).

Spectroscope 303 includes diffraction grating 331, which is a spectrum element that deflects and separates the incident light from different directions into one plane, according to the wavelength of the incident light. The light that passes through diffraction grating 331 enters the optical element, $332a_1$ . . . $332a_k$, which diffuse the light. In the following, these optical elements are called "diffusion optics elements". These diffusion optics elements $332a_1$ . . . $332a_k$ are composed of two or more concave portions formed on the united tabular optical material 332, and each of them forms a concave cylindrical lens. On the incident surface of tabular optical material 332, a shading film 332b is present in all areas other than on the diffusion optics elements 332a themselves. In optical material 332, only the light from specific chemical species (i.e., the desired emission bands) is selected, and all wavelengths not belonging to the selected bands are removed. Optical material 332 is a material that permits passage of the desired wavelengths of light (extraction) and blocks unnecessary wavelengths. Diffusion optics element 332a can be a convex mirror (convex cylindrical surface mirror).

In spectroscope 303, according to the emission spectra of OH*, CH*, CN*, $C_2$*(1), and $C_2$*(2), the light that enters each of the diffusion optics elements 332a is preferably composed of at least one of the following bands: the first band with wavelength 306.4 nm, half-width from 10 to 15 nm, the second band with wavelength 388 nm, half-width from 10 to 15 nm, the third band with wavelength 431.5 nm, half-width from 1 to 2 nm, the forth band with wavelength 473.3 nm, half-width from 1 to 2 nm, the fifth band with wavelength 516.5 nm, half-width from 1 to 2 nm, the sixth band with wavelength 650 nm, half-width from 10 to 15 nm, and the seventh band with wavelength 810 nm, hall-width from 10 to 15 nm.

The light of each wavelength band that has entered into each diffusion optics element $332a_1 \ldots 332a_k$, respectively, is diffused and is received by line sensor 333 (a line image sensor), which is a light-receiving means. For this light-receiving means, it is possible to use an image sensor, such as a CCD, that can be operated at high speed. For instance, one can use an image tube, such as an image intensifier connected to a CCD, or an image tube with an electronic driving-type CCD, useful for fluorescent surfaces. A light-receiving element can enable position tracking; for example, a multi-anode-type photoelectric amplifying tube, etc., can act as a position-detection light measurement device with high sensitivity and high-speed operation. With a light-receiving means, it is possible to acquire time-series measurements at high speed, especially using a light-receiving element like the photoelectric amplifying tube, which enables high-speed optical measurements. In this case, the sampling rate of the measurement can be set, for instance, from 100 kHz to several hundred MHz.

Thus, in this spectroscope, only the light of a specific wavelength band that enters each diffusion optics element $332a_1 \ldots 332a_k$ is selectively expanded and received; that is, the wavelengths of light corresponding to emission from OH*, the wavelengths of light corresponding to emission from CH*, the wavelengths of light corresponding to emission from CN*, the wavelengths of light corresponding to emission from $C_2*(1)$, and the wavelengths of light corresponding to emission from $C_2*(2)$, are expanded and received, and a spectrum with high wavelength resolution can be constructed.

As shown above, by applying spectroscope 303 of the present invention, local measurements of the light from a specific emission band is possible at high wavelength resolution, and time-series measurements at high speed and high time resolution are possible. By constructing the optical measurement device 300, as shown in FIG. 1, it is possible to obtain local time-series of measurements of light at the multipoint of multiple measurement points as a result, it is possible to obtain information on the minute reaction mechanism(s), such as plasma and combustion.

Figure 4:
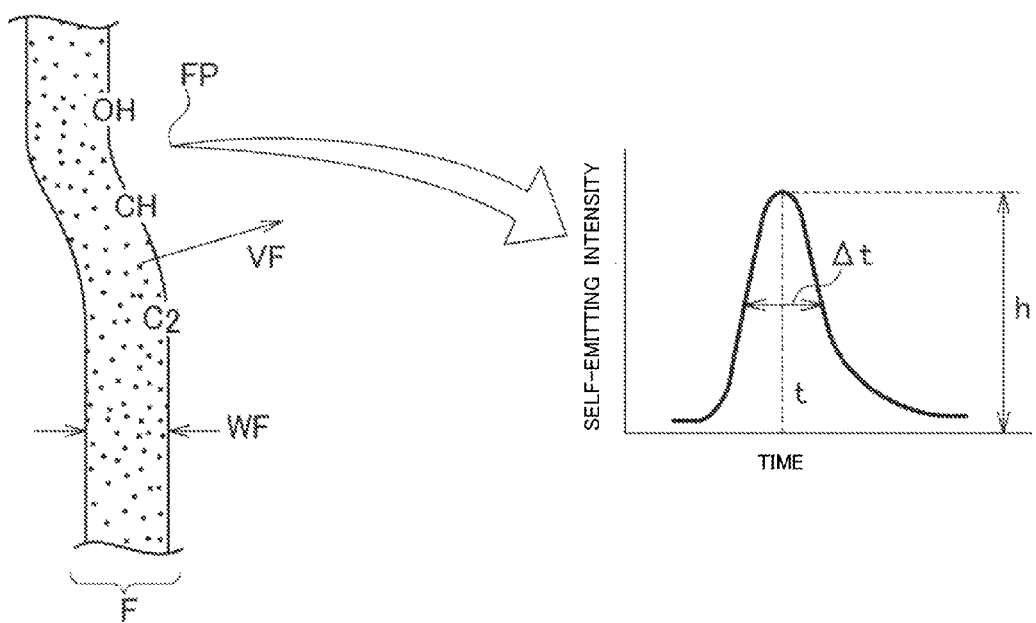
FIG. 4 is a pattern diagram explaining the relationship between the reaction and the emitted light.

By using the optical measurement device 300 to analyze the reaction(s) in various combustion equipment, etc., a great deal of important information can be obtained. For instance, in an automobile engine, the reaction moves and spreads with passing speed VF, while it forms the reactive belt F with width WF on the order of 0.1 mm, as shown in FIG. 4. At this time, when light is measured at the measurement point FP, an increase in the peak light intensity corresponding to the passing reactive belt F is observed. It is possible to obtain information on the passing time, according to the time t at which this peak appears, information on the time required to pass, according to the width of the peak ($\Delta t$), and information on the strength of the reaction, according to the peak intensity, h.

However, the width WF and the passing speed VF cannot be obtained from the measurement of light at a single measurement point. Direct information on the reaction conditions and their changes can be obtained only by measuring the light emission from multiple points (i.e., at the multipoint, using the optical measurement device 300) and observing the correlations between optical changes at each measurement point.

In addition, a great deal of information, such as the moving direction, etc., of the reaction can be efficiently obtained by assuming the multipoint to be a two- or three-dimensional matrix. Moreover, a more minute mechanism, such as the distribution of reactive strength in the reactive belt, can be clarified by high-resolution measurements. In addition, according to the changes and correlation, etc., of light from each chemical species, information such as the local air/fuel ratio (A/F), the turbulent flow structure, and the local dam Keller numbers, etc., can be obtained.

Such a measurement is not limited to automobile engines. Such a measurement can be applied to reciprocating, rotary, and diesel engines used for ships, power generation, aircraft, etc., for hydrogen-fueled engines, and for other internal combustion engines, such as gas turbine, ram, and scramjet engines used for aircraft and thermal power generation. Moreover, in an outside combustion engine, such as the Stirling engine, as long as the heat source includes a chemical reaction, the measurement method can be applied to the heat source. Furthermore, it can also be applied to various combustion equipments, such as a combustor, a fire furnace, a boiler using an atomization combustion method, an oil burner, a waste incinerator, a blast furnace, on oven, furnaces such as kilns for pottery and glass manufacturing, and hot water boilers. Moreover, it can be applied to apparatuses that use a plasma reaction, such as those used for bacteria elimination/sterilization, semiconductor manufacturing, etc.

Moreover, it is possible to obtain even more information by using conventional methods to measure reaction conditions together with the optical measurements. In particular, because the focusing optics system in the optical measurement device 300 has a very high focusing efficiency compared with a typical lens system, it can also be applied as a focusing system for laser measurements of the reaction.

For instance, the measurement volume in the optical measurement device 300 is the same or less than that in the Laser Doppler flow velocity meter (Laser Doppler Anemometry: LDA) or the Phase Doppler flow velocity meter (Phase Doppler Anemometry: PDA). Optical measurements made simultaneously with those measurements make it possible to estimate the local combustion speed from the local gas-flow velocity and the passing speed of the reaction. Moreover, because the measurement volume or the LDA and PDA generally has a length of several hundred nm to several tens of mm in the direction of an optical axis, it is possible to measure the distribution of the measured flow velocity in the measurement volume of the LDA, PDA, etc. by measuring it simultaneously with high-resolution optical measurements. Moreover, it is possible to obtain knowledge about the reaction mechanism by simultaneously using the laser generation fluorescence method (Laser-Induced Fluorescence, LIF).

The spectroscope of this embodiment is not limited to measurements of the reaction conditions; for example, it can be applied to spectral measurements used for quality inspections, component analysis, spectral processing of optical information transmission, etc.

In the previously mentioned embodiment, the wavelengths of light that entered each diffusion optics element were chosen to correspond with the light emission bands from OH*, CH*, CN*, $C_2*(1)$, and $C_2*(2)$. However, the wavelengths of light that enter each diffusion optics element are not limited to this example. Light enters the diffusion optics elements only after the desired number of spectral hands and their wavelength ranges have been selected by the user. The wavelengths selected can also correspond to synchrotron radiation, reflected light, Raman scattering of the target sample, luminescence, or the light remaining after light absorption by the sample and could be used to identify the atoms, molecules, ions, free radicals, etc. that comprise the sample.

2nd Embodiment

In the 1st embodiment, spectroscope 303 was configured to process the light ejected from a single optical fiber. However, the present invention is not limited to such an embodiment. The 2nd embodiment of the present invention is described as follows.

Figure 5:
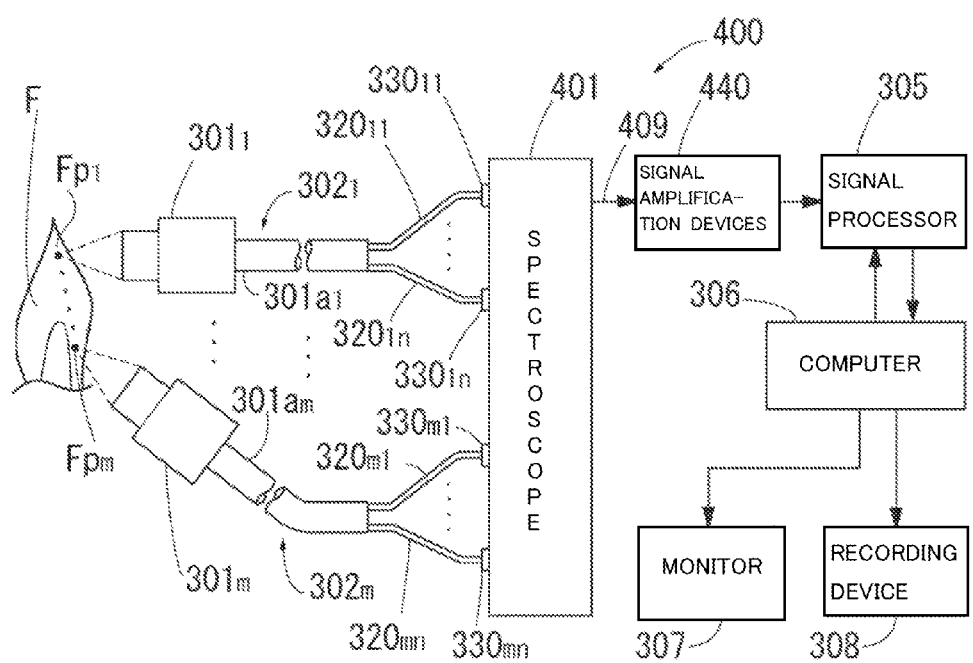
FIG. 5 is a block chart showing the configuration of optical measurement device 400 that uses spectroscope 401 of the $2^{nd}$ embodiment of the present invention.

The block chart in FIG. 5 shows the configuration of optical measurement device 400, which uses spectroscope 401 of this embodiment. As shown in FIG. 5, optical measurement device 400 is composed of the same signal processor 305, computer 306, monitor 307, and recording device 308 listed in the 1st embodiment. The optical measurement device 400 is also composed of a focusing optics system 301, an optical fiber array 302, optical fibers $320_{11} \ldots 320_{1n}$, and m (m≥1) optical systems similar to the optical system consisting of joints $330_{11} \ldots 330_{1n}$ the 1st embodiment, as shown in FIG. 1. Hereafter, the focusing optics system, the optical fiber array, the optical fibers, and the joints that comprise the m optical systems are referred to respectively as the focusing optics systems $301_1 \ldots 301_m$, optical fiber arrays $302_1 \ldots 302_m$, optical fibers $320_{11} \ldots 320_{mn}$, and joints $330_{11} \ldots 330_{mn}$. In addition, optical measurement device 400 is composed of spectroscope 401, signal road 409, and signal amplification device 440, which substitute for spectroscope 303, signal road 309, and signal amplification device $304_1 \ldots 304_n$, respectively, as shown in FIG. 1.

Spectroscope 401 processes the light ejected from two or more parallel optical fibers simultaneously, as described below. Signal road 409 and signal amplification device 440 transmit and amplify the signal generated from the simultaneous bulk processing by spectroscope 401, respectively.

Figure 6:
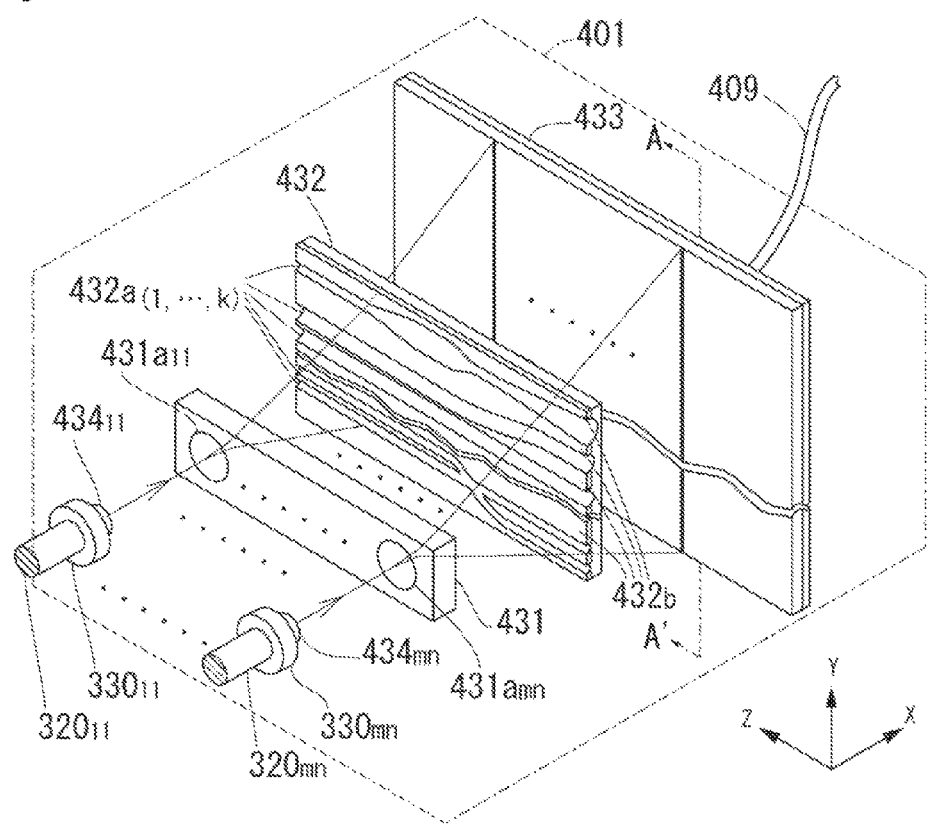
FIG. 6 is an oblique perspective figure showing the configuration of spectroscope 401.
Figure 7:
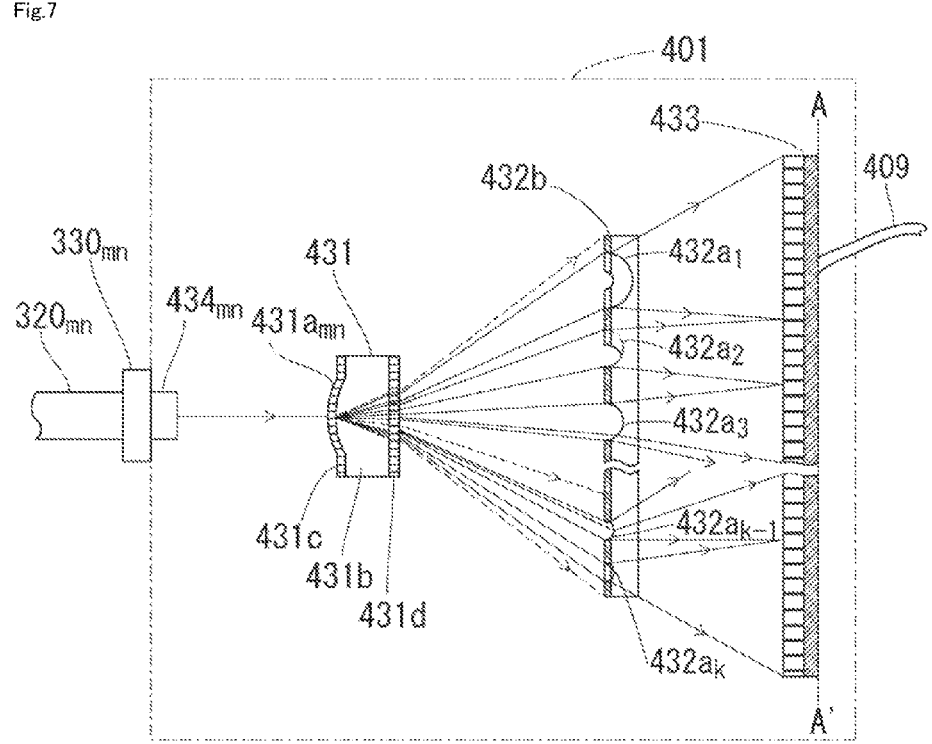
FIG. 7 is an A-A' cross section of FIG. 6, showing the configuration of spectroscope 401.

The oblique perspective figure (FIG. 6) shows the internal composition of spectroscope 401. FIG. 7 shows the A-A' cross section of spectroscope 401 shown in FIG. 6. As shown in FIG. 6, the ejection edge surfaces of optical fibers $320_{11} \ldots 320_{mn}$ are connected to spectroscope 401 in a row in the Z direction through joints $330_{11} \ldots 330_{mn}$. This spectroscope 401 is composed of: spectrum element 431, in which convex parts $431a_{11} \ldots 431_{mn}$ are formed, respectively, at the positions opposite to the ejection edge surfaces $434a_{11} \ldots 434_{mn}$ of optical fibers $320_{11} \ldots 320_{mn}$; tabular optical element 432, in which ditched diffusion optics elements $432a_1 \ldots 432a_k$ and shading film 432b are formed on the sides opposite to the surface of spectrum element 431; and image sensor 433. The spectrum element 431, tabular optical element 432, and image sensor 433 are arranged in order along the X axis from the side of optical fiber 320. In image sensor 433, light-receiving elements, such as CCD, CMOS, and photoelectric amplifying tubes, are arranged as a matrix in the Y-Z plane.

In spectrum element 431, as shown in FIG. 7, the diffraction grating is formed on surface 431c, where convex part 431a is formed, and surface 431d is on the opposite side; homogeneous medium 431b (with translucency) is between the two surfaces. Convex part 431a functions as a collimator of light that enters from optical fiber 320 along the X axis. In surfaces 431d and 431c, on which the diffraction grating is formed, the incident light is inclined and separated in different directions, depending on the wavelength, within the X-Y plane. In other words, the incident light is inclined twice, once by surface 431c and again by surface 431d, both times depending on the wavelength. Thus, the deflection angle further increases. This increase in deflection angle facilitates miniaturization of spectroscope 401 and improves resolution in the wavelength selection. If a high-refractive index medium is selected for medium 431b, the difference in deflection angle for different wavelengths of light increases further. This further increase in deflection angle further facilitates miniaturization of spectroscope 401 and improves resolution in the wavelength selection.

Diffusion optics elements $432a_1 \ldots 432a_k$ of tabular optical element 432 diffuse the light that passes through spectrum element 431. The positions of diffusion optics elements $432a_1 \ldots 432a_k$ in the X, Y, and Z axes are selected according to the wavelengths chosen and the position along the Z axis of the measurement point, as shown in FIG. 6. Diffusion optics elements $432a_1 \ldots 432a_k$ may have their scoring made in the Z direction. Moreover, diffusion optics elements $432a_1 \ldots 432a_k$ may mutually intersect.

From the above explanation, it is evident that spectroscope 401 of this embodiment functions similar to a configuration in which many spectroscopes 303 of the 1st embodiment are lined up along the Z axis, with spectrum element 431 substituting for the collimators.

The movement of spectroscope 401 of this embodiment is described as follows, according to the optical path of light ejected from optical fiber 320. As shown in FIG. 7, when light is ejected from edge surface $434_{nm}$ of optical fiber $320_{mn}$ and enters spectroscope 401, the light reaches convex part $431a_{mn}$ of spectrum element 431. The light is then refracted and converted into parallel rays by convex part $431a_{mn}$ and is then deflected and separated in different directions, depending on the wavelength, by the diffraction grating formed on surface 431c. The light that has been deflected and separated penetrates medium 431b, is further deflected and separated, depending on wavelength, by a second diffraction grating formed on surface 431d, and finally is ejected to enter tabular optical element 432.

From among the wavelengths of light ejected from spectrum element 431, the selected wavelengths that reach diffusion optics element 432a are diffused by diffusion optics element 432a and are sequentially ejected to image sensor 433.

The light ejected from tabular optical element 432 thus reaches image sensor 433. These wavelengths are received sequentially by the optical elements arranged at the light-reaching position and are converted into electrical signals, one after another. The converted electric signals are sequentially input to signal amplification device 440, shown in FIG. 5, through signal road 409 at each posit ion of the optical element. Signal amplification device 440 amplifies the inputted electrical signals and outputs them to signal processor 305. Therefore, the signal inputs to signal processor 305 include information that shows the position of the light-receiving element that received the light the position that the light reached in the Y and Z directions at image sensor 433), the intensity of the light that reached the position, and the respective time at which the light reached the position.

The position that the light reaches along the Z axis of image sensor 433 is determined by the particular optical fiber that ejects the light. The position that the light reaches along the Y axis of image sensor 433 is determined by the wavelength of the light and the shape of diffusion optics element 432a at the Z-axis position of the light. The depth, width, curvature, and position along the Y axis of diffusion optics element 432a is determined beforehand by the position of the light along the Z axis. In other words, by appropriately selecting the connection order of the optical fibers and the shape of diffusion optics element 432a, it is possible for the desired light-receiving element on image sensor 433 to receive, with the desired resolution, specific wavelengths of light that are ejected from each optical fiber.

Thus, in spectroscope 401, only light of specific wavelengths enters each of the diffusion optics elements 432$a_1$ . . . 432$a_k$ and is selectively expanded and received; therefore, a spectrum with high wavelength resolution is obtained. In addition, the selectively expanded and received band can be selected for each optical fiber.

In this embodiment, the light may be received by a camera instead of image sensor 433. Therefore, the photograph film, dry plate, printing paper, etc. have to be arranged at the position of image sensor 433 such that the surface of the photosensitive material can be exposed to the diffusion optics element. A shutter may be added to control the exposure time. The shutter may be positioned in the vicinity of the photosensitive material, or it may be positioned at an earlier stage, such as at the optical element, diffraction grating, or collimator. It does not matter whether the shutter is mechanical or electronic.

MODIFIED EXAMPLE, ETC.

Figure 8:
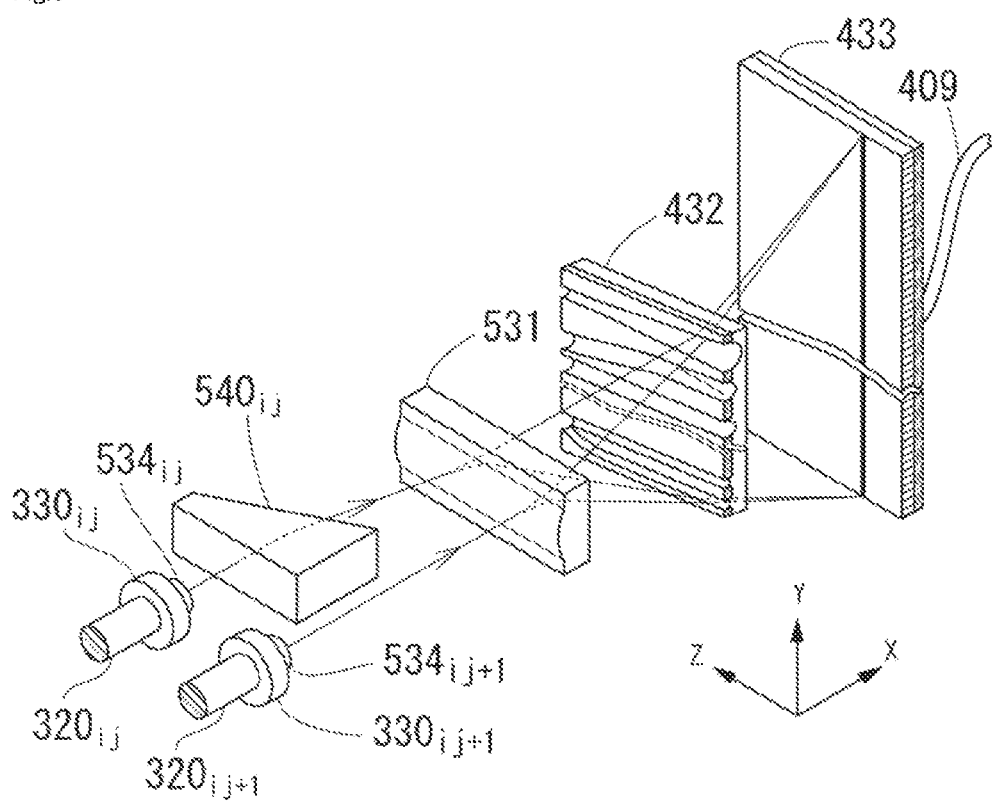
FIG. 8 is an oblique perspective figure showing the configuration of the spectroscope in the modified example of the $2^{nd}$ embodiment.

In the above $2^{nd}$ embodiment, the light that enters spectroscope 401 from each optical fiber is not deflected in the Z direction (FIG. 6), but rather is deflected in the X-Y plane. However, the present invention is not limited to such an embodiment. For instance, as shown in FIG. 8, this light may be deflected in the Z direction by arranging wedge prism 540 to intercept the optical path of the light ejected from optical fiber 320$_{ij}$. In the example shown in FIG. 8, in spectrum element 531, a diffraction grating is formed on a light-incident surface as well as on the light-ejection surface, the same as spectrum element 431 of the $2^{nd}$ embodiment. However, in the convex part of spectrum element 531, unlike that of spectrum element 431, the similar convex part is formed on the sides of optical fibers 320$_{ij}$ and 320$_{ij+1}$ in the Z direction to convert the light to parallel rays within the X-Y plane.

Moreover, in this example, at the ejection edge surfaces 534$_{ij}$ and 534$_{ij+1}$ of optical fibers 320$_{ij}$ and 320$_{ij+1}$, respectively, the collimator (not shown in the figure) that converts the optical path is set up in such a way that light is ejected from these optical fibers in parallel rays within the X-Z plane. As a result, the light ejected from each optical fiber 320$_{ij}$ and 320$_{ij+1}$ travels in rays that are mutually parallel to one another in the X-Z plane. Among these parallel rays, the light ejected from optical fiber 320$_{ij+1}$ enters spectrum element 531.

When the light ejected from optical fiber 320$_{ij+1}$ enters spectrum element 531, the light is collimated and inclined, depending on the wavelength, in the X-Y plane by spectrum element 531 and reaches image sensor 433 after the desired band is diffused selectively by tabular optical element 432. On the other hand, the light ejected from optical fiber 320$_{ij}$ is inclined in the Z direction by wedge prism 540. The inclined light reaches image sensor 433 through spectrum element 531 and tabular optical element 432.

Thus, in the spectroscope of the $2^{nd}$ embodiment, by deflecting light in the Z direction, it is possible for the light ejected from two or more optical fibers to be superimposed and to be received on one light-receiving element. As a result, the following example processing can be executed, entirely in optics.

By arranging wedge prism 540 between the tabular optical element 432 and image sensor 433, light of a specific band of wavelengths that is ejected from two optical fibers can be superimposed. In this case, if the light from one optical fiber is in phase with the light from the other optical fiber, then the light-receiving element that receives the light will output a signal corresponding to the total intensity of the combined light. If the light rays from the two optical fibers are opposite in phase, then the light-receiving element will output a signal corresponding to the absolute value of the difference in light intensity of the two rays. By combining the addition and subtraction of light intensities, it is possible to perform calculations, entirely in optics, related to the intensity of light. Such optical calculations can be made, not only from the light, ejected from two or more optical fibers, but also from the light leaving selected elements along a single optical path. For instance, the light resulting from plasma luminescence or spontaneous glow, or the light remaining after light absorption by a certain material, might exhibit a spectral peak that consists of two or more discrete bands. The respective bands in such a spectral peak can be superimposed. This superimposed light is characteristic of the material corresponding to the light that entered the device.

In this modified example, when the light ejected from two or more optical fibers is superimposed, the optical fibers need not always be arranged in the Z direction but may be arranged in the Y direction. Moreover, in this modified example, the diffraction grating, etc. used to correct the chromatism caused by deflection in the Z direction at the wedge prism may form on the wedge prism itself. Moreover, the wedge prism may form on tabular optical element 432.

In this embodiment, on a tabular optical element, the shading film is formed where the wavelengths that are to he ignored fall; however, the convex lens may form on this part. Thus, it is possible both to receive selected wavelengths of light by numerous light-receiving elements and to receive all of the light ejected from a particular optical fiber by one image sensor, while a small number of light-receiving elements receive the non-selected wavelengths of light.

One may also use filters, such as interference filters and polarized light filters, to control which wavelengths may reach the image sensor; such filters may be arranged on an optical element.

In each of the above embodiments, the diffraction grating was described as a spectrum element. However, the present invention is not limited in such an embodiment. A prism or an optical element that consists of a combination of a prism and diffraction grating may be used as a spectrum element. Moreover, the spectrum may be obtained by a combination of reflection (partial reflection) and transmission. Moreover, the spectrum may be obtained by a combination of reflection and deflection, such as a Roland circle spectroscope. Moreover, the spectrum element may be formed with a filter and/or Daicroiccmirar. However, in this case, the light selected by the filter or Daicroiccmirar should be deflected to another angle according to the element selected.

In each of the above embodiments, the concave lens and the convex mirror were described as diffusion optics elements; however, the present invention is not limited to such an embodiment. For instance, a prism and a diffraction grating, etc. may be used as a diffusion optics element. When the light-polarized surfaces of the diffusion optics element and spectrum element are arranged to match, the diffusion optics element diffuses the light by increasing or decreasing the deflection angle of each wavelength leaving the spectrum element. As a result, the desired band of wavelengths can be expanded and received, as is also the case when a concave lens and/or convex mirror is used as the diffusion optics element. Moreover, a Nicol prism, Prizmurostion, or Worrastomprizm, etc. may be used. In this case, each wavelength deflected by the spectrum element is diffused and separated, depending on the polarization of the light.

Moreover, the spectrum element is not limited to one that deflects and separates the incident light in different directions according to wavelength. For instance, by using a polarizing prism, such as a Nicol prism, as a spectrum element, it is possible to deflect and separate incident light in different directions according to the polarization of the light; therefore, light that is polarized only in a specific direction can be selected to be expanded and received by the diffusion optics element. If Prizmurostion or Worrastomprizm, etc. are used in place of a Nicol prism, it is possible to obtain a spectrum of polarized light and to selectively expand the polarized light in the ultraviolet region of the spectrum.

In addition, the reference light of a holographic device may be introduced into this spectroscope and used to irradiate the image sensor. This reference light may irradiate the image sensor through the spectrum element and the diffusion optics element or may be introduced directly to the image sensor. As a result, it is possible to obtain information on the phase of the received light.

Figure 9:
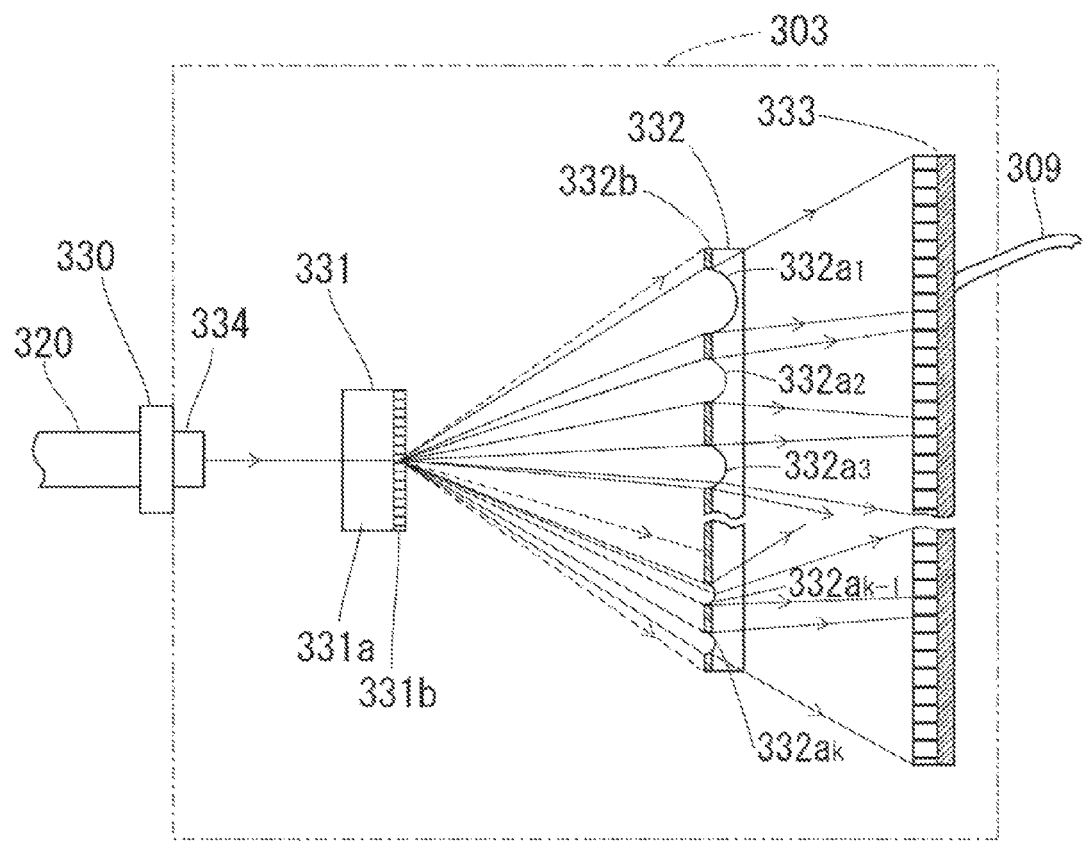
FIG. 9 is a side view showing another configuration of the spectroscope in the modified example of the $2^{nd}$ embodiment.

Moreover, in the above-mentioned embodiment, in each diffusion spectrum element, the spectroscope is composed so that the wavelengths of the diffused light do not overlap on the light-receiving surface of a light-receiving means (e.g., image sensor, etc.). In this case, overlapping of discrete wavelengths of light on a light-receiving surface of a light-receiving means may be prevented by adjusting the diameter of each diffusion spectrum element, or overlapping of each element of light on a light-receiving surface of a light receiving means may be prevented by adjusting the distance between the optical medium formed on each diffusion spectrum element and the light-receiving means. Moreover, on a light-receiving surface of a light-receiving means, the space formed between two adjoining light-receiving surfaces (FIG. 9) or between the edges of the light-receiving means may be matched. This configuration can he applied not only to the $2^{nd}$ embodiment, but also to the $1^{st}$ embodiment.

Moreover, in the above embodiment, the spectroscope has been configured to be able to select the wavelengths of light that correspond to light emission by particular free radicals. However, the spectroscope may be configured to be able to select the wavelengths of light that correspond to emission by heavy metals (e.g., lead, mercury, cadmium, and hexavalent chromium, etc.).

Moreover, in the above embodiment, the angle at which the diffusion spectrum element diffuses the light may be varied, according to the spectral band selected. Specifically, within the spectral band for which improved spatial resolution is desired the band that is to be analyzed in detail), the diffusion angle created by the diffusion spectrum element can be widened compared with other regions of the spectrum. As a result, in a light-receiving means, the optical area that receives the light within the desired spectral band is relatively broadened and the number of pitches in the image sensor increases, resulting in greater spatial resolution. On the other hand, for regions of the spectrum in which spatial resolution is not needed or desired, the diffusion angle created by the diffusion spectrum element is narrowed compared with the spectral region of interest. As a result, in a light-receiving means, the optical area that receives the light from regions of the spectrum that are not of interest is relatively narrowed, and the number of pitches in the image sensor decreases, resulting in less spatial resolution. Thus, by varying the diffusion angle created by the diffusion spectrum element, according to the spatial resolution needed, a light-receiving surface of a light-receiving means can be efficiently used.

Moreover, in the above embodiment, a variety of optical elements can be installed between the ejection surface of an optical fiber and the spectrum element. For instance, it is possible to install an optical element (e.g., a Daicroicc mirror and wideband wavelength selection filter) to exclude non-wanted wavelengths beforehand, or an optical element can be used to select specific wavelengths according to the angle of the incident light.

The embodiments disclosed at this time are only examples, and the range of the present invention is not limited to the above embodiments. The range of the present invention is shown by each claim below, considering the description of the specification and the drawing and includes all changes within the meaning and the range that are equivalent to the description described therein.

The present invention is applied to a spectroscope, an optical measurement device that measures, for example, selectable, prescribed bands within an optical spectrum.

The invention claimed is

1. A spectroscope comprising:
a spectrum element deflecting and separating incident light in different directions, depending on an element of the incident light;
at least one optical element diffusing a light that has passed through said spectrum element and has entered the optical element; and
a light-receiving means receiving light that has passed through said optical element;
wherein the spectroscope is configured such that only light that has a specific deflection angle within a specific range of wavelengths from among all the light that entered said optical element is selectively expanded by said optical element and received by said light-receiving means.

2. The spectroscope according to claim 1, wherein
said optical element permits passage of the desired wavelengths of light and blocks unnecessary wavelengths.

3. The spectroscope according to claim 1, wherein
each element of said light that is diffused by said optical element does not overlap on a light-receiving surface of said light-receiving means.

4. The spectroscope, according to claim 1, wherein
said spectrum element deflects and separates said incident light in different directions according to wavelength.

5. The spectroscope according to claim 4, wherein
said spectrum element is a diffraction grating.

6. The spectroscope according to claim 5, wherein
said diffraction grating is formed on a refraction surface of a collimator that converts said incidence light into parallel rays.

7. The spectroscope according to claim 4, wherein
said spectrum element is a prism.

8. The spectroscope according to claim 3, wherein
a spectral band of said light that enters said optical element is at least one band that has been chosen beforehand, according to a sample component analysis based on a spectroscopic measurement.

9. The spectroscope according to claim 3, wherein
a spectral band of said light that enters said optical element contains at least one among: a first band with wavelength 306.4 nm, half-width from 10 to 15 nm; a second band with wavelength 388 nm, half-width from 10 to 15 nm; a third band with wavelength 431.5 nm, half-width from 1 to 2 nm; a fourth band with wavelength 473.3 nm, half-width from 1 to 2 nm; a fifth band with wavelength 516.5 nm, half-width from 1 to 2 nm; a sixth band with wavelength 650 nm, half-width from 10 to 15 nm; and a seventh band with wavelength 810 nm, half-width from 10 to 15 nm.

10. The spectroscope according to claim 1, wherein said spectrum element deflects and separates said incident light in different directions according to a polarization angle of the light.

11. The spectroscope according to claim 1, wherein said spectrum element is an inclination prism.

12. The spectroscope according to claim 1, wherein said light-receiving means is a line sensor.

13. The spectroscope according to claim 1, wherein said light-receiving means is an image sensor that has light-receiving elements arranged in a matrix.

14. The spectroscope according to claim 13, wherein said incident light respectively enters said light-receiving elements from two or more positions in parallel to a light-deflected surface by said spectrum element and along optical axes with prescribed angles to an arrangement plane of said light-receiving elements of said image sensor.

15. The spectroscope according to claim 1, wherein said light-receiving means is an exposure device that receives the light that has passed through said optical element and exposes a prescribed photosensitive material to this light.

16. The spectroscope according to claim 1, wherein said incident light enters from two or more positions and each ray of light that is separated into its spectrum by said spectrum element and is selectively expanded by said optical element from among said incident light is received on one prescribed straight line.

17. The spectroscope according to claim 1, wherein said optical element is a concave lens or a convex mirror.

18. The spectroscope according to claim 1, wherein said optical element is a prism or a diffraction grating whose light-polarized surface matches the light-polarized surface of said spectrum element.

19. The spectroscope according to claim 1, wherein said optical element is a Nicol prism, Prizmurostion, or Worrastomprizm.

20. The spectroscope according to claim 1, further comprising a means to irradiate said light-receiving elements with a reference light.

\* \* \* \* \*